E. E. LILLEGREN.
LAWN PROTECTOR.
APPLICATION FILED DEC. 26, 1908.
915,975.
Patented Mar. 23, 1909.
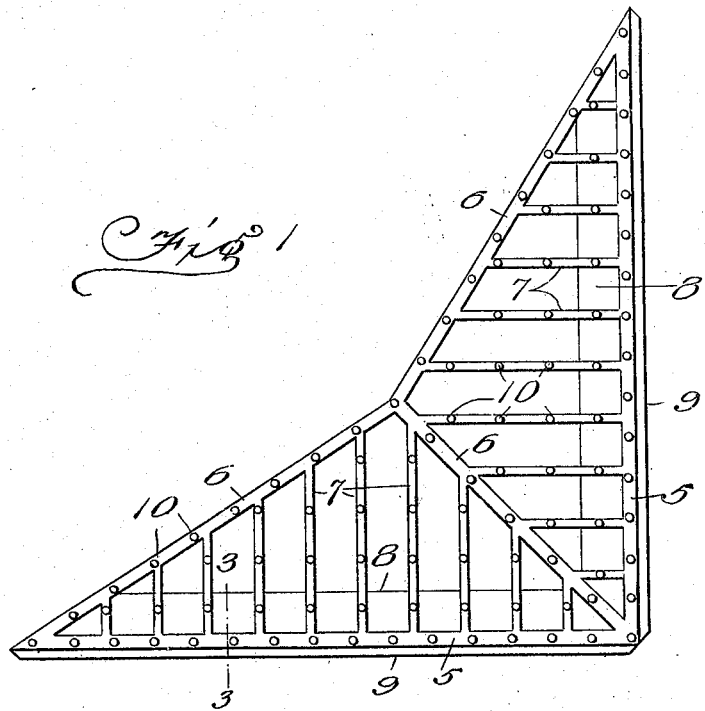
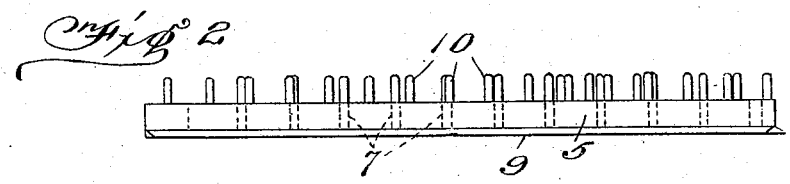
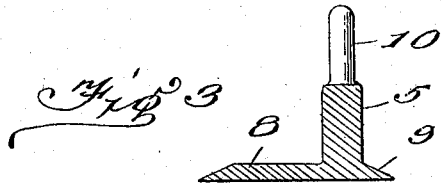
Inventor
E. E. Lillegren.
Witnesses
By
Attorney

UNITED STATES PATENT OFFICE.

ENOCH E. LILLEGREN, OF MINNEAPOLIS, MINNESOTA.

LAWN-PROTECTOR.

No. 915,975.　　　Specification of Letters Patent.　　　Patented March 23, 1909.

Application filed December 26, 1908. Serial No. 469,286.

*To all whom it may concern:*

Be it known that I, ENOCH E. LILLEGREN, citizen of the United States, residing at Minneapolis, in the county of Hennepin and State of Minnesota, have invented certain new and useful Improvements in Lawn-Protectors, of which the following is a specification.

This invention is a corner protector for lawns and parking and comprises a skeleton plate having upstanding pins.

The object of this invention is to save the grass at the corners of lawns and parks from being trampled, due to people crossing said corners and at the same time to provide a device which is substantially invisible in use.

The construction will be apparent from the following specification and drawings thereof in which—

Figure 1 is a top plan view of the invention; Fig. 2 is a side elevational view; Fig. 3 is a sectional view on line 3—3 of Fig. 1.

Referring to the drawings, the protector consists of side pieces 5 extending at angles as desired to fit the corners of the lawn, and pieces 6 connecting the ends and corners of the pieces 5. Between the pieces 5 and 6, and perpendicular to the pieces 5 are webbed pieces 7, which are distributed uniformly within the frame formed by the pieces 5 and 6. At the bottom of the pieces 5 are flanges 8 which extend outwardly, and which serve to form a substantial base for the device at the edge or border of the lawn. The upper faces of the pieces 5, 6 and 7 have upstanding pins or projections 10 which are two or three inches in height. These pins are spaced on the several pieces so as to make walking thereon impossible or impracticable.

In use, the protector is embedded in the ground, so that the upper faces of the pieces 5, 6 and 7 are on a level with the ground. The flanges 8 and 9 afford a bed plate, which bears the weight impressed upon the pins 10 and prevents the device from settling into the ground. The pins 10 being about the height of the grass, they may be painted green and thus made obscure.

The device being composed of narrow strips and the space therebetween being comparatively broad, the grass grows between the strips and practically conceals the strips and the pins thereon from sight.

Various modifications may be made within the scope of the claims and the invention is not limited to the exact device shown.

I claim:

1. A lawn corner protector comprising side pieces, connecting diagonal pieces, and webbed pieces therebetween, and pins upstanding from the several pieces.

2. A lawn protector comprising side pieces having flanges at the bottoms thereof diagonal pieces connected to the side pieces and webbed pieces connected at their ends to the side and diagonal pieces, and pins upstanding from the several pieces.

In testimony whereof, I affix my signature in presence of two witnesses.

ENOCH E. LILLEGREN.

Witnesses:
　EXRA J. HURLEY,
　D. BERTRAM FULLER.